(12) United States Patent
Ricotti et al.

(10) Patent No.: US 7,885,168 B2
(45) Date of Patent: Feb. 8, 2011

(54) READ/WRITE DEVICE FOR A MASS STORAGE DEVICE, AND READ/WRITE METHOD THEREOF

(75) Inventors: Giulio Ricotti, Broni (IT); Marcellino Gemelli, Trezzano sul Naviglio (IT)

(73) Assignee: STMicroelectronics, S.r.l., Agrate Brianza (IT)

( * ) Notice: Subject to any disclaimer, the term of this patent is extended or adjusted under 35 U.S.C. 154(b) by 1269 days.

(21) Appl. No.: 11/019,933

(22) Filed: Dec. 21, 2004

(65) Prior Publication Data

US 2005/0162932 A1 Jul. 28, 2005

(30) Foreign Application Priority Data

Dec. 29, 2003 (EP) .................................. 03425826

(51) Int. Cl.
*G11B 7/00* (2006.01)
(52) U.S. Cl. ..................................... 369/126
(58) Field of Classification Search ................. 369/126, 369/288; 250/492.22; 257/417, 656
See application file for complete search history.

(56) References Cited

U.S. PATENT DOCUMENTS

| | | | |
|---|---|---|---|
| 3,334,352 A | 8/1967 | Abbondante et al. | |
| 5,323,377 A | 6/1994 | Chen et al. | |
| 5,713,667 A | 2/1998 | Alvis et al. | |
| 5,751,683 A | 5/1998 | Kley | |
| 5,835,477 A | 11/1998 | Binnig et al. | |
| 5,886,922 A * | 3/1999 | Saito et al. ................... | 365/164 |
| 6,049,115 A * | 4/2000 | Takahashi et al. ........... | 257/417 |
| 6,388,252 B1 * | 5/2002 | Takahashi et al. .............. | 850/7 |
| 6,479,892 B1 * | 11/2002 | Hopson et al. .............. | 257/684 |
| 7,126,139 B2 * | 10/2006 | Schenkel et al. ........ | 250/492.22 |
| 7,423,954 B2 * | 9/2008 | Mejia .......................... | 369/126 |
| 2005/0135224 A1 * | 6/2005 | Mejia et al. .................. | 369/126 |

FOREIGN PATENT DOCUMENTS

| | | | |
|---|---|---|---|
| EP | 03425826 | 6/2004 | |
| JP | 11-304825 | * 11/1999 | ................. 369/126 |
| WO | WO02/37488 A1 | 5/2002 | |

OTHER PUBLICATIONS

Vettiger P et al.: The Millipede-Nanotechnology Entering Data Storage, IEEE Transactions on Nanotechnology, IEEE Service Center, Piscataway, NY, US, vol. 1, No. 1, Mar. 2002, pp. 39-55.
Eleftheriou E et al., A MEMS-Based Scanning-Probe Data-Storage Sywtem, IEEE Transactions on Magnetics, ieee Service Center, Piscataway, NY, US, vol. 39, No. 2, Mar. 2003, pp. 938-945.

* cited by examiner

*Primary Examiner*—Nabil Z Hindi
(74) *Attorney, Agent, or Firm*—Lisa K. Jorgenson; Kevin D. Jablonski; Graybeal Jackson LLP

(57) ABSTRACT

A data-storage device has a data-storage medium storing data as local deformations, and at least one read/write element including a supporting structure, which carries a local probe arranged facing the data-storage medium. The local probe is formed by a bipolar junction. The supporting structure is formed by a first and a second arms of semiconductor material, carried by a substrate and extending in cantilever fashion above a cavity made within the substrate.

29 Claims, 3 Drawing Sheets

READ/WRITE DEVICE FOR A MASS STORAGE DEVICE, AND READ/WRITE METHOD THEREOF

PRIORITY CLAIM

This application claims priority from European Patent Application No. 03425826.9, filed Dec. 29, 2003, which is incorporated herein by reference.

TECHNICAL FIELD

The present invention relates generally to a read/write device for a mass storage device.

BACKGROUND

As is known, current data-storage systems that exploit a technology based upon magnetism, such as, for example, computer hard disks, suffer from important limitations in regards to data-storage capacity, read/write speed, and dimensions.

In recent years, there have consequently been proposed alternative data-storage systems, in particular based upon techniques of silicon micromachining, with the purpose of achieving data-storage densities and read/write speeds that cannot be achieved with traditional techniques.

For example, the data-storage system proposed by IBM and referred to as "Millipede" (see in this regard "The "Millipede"—Nanotechnology Entering Data Storage", P. Vettiger et al., IEEE Trans. on Nanotechnology, Vol. 1, No. 1, March 2002) exploits a type of technology based upon silicon nanometric read/write heads, similar to the ones used in atomic-force microscopes (AFMs) or in scanning tunnelling microscopes (STMs) to obtain images at an atomic scale. For a better understanding, reference may be made to FIG. 1, which shows a general diagram of the "Millipede" system.

As illustrated in FIG. 1, a mass storage device 1 according to the "Millipede" system is made up by a two-dimensional array 2 of cantilever elements 3, of silicon, which are obtained exploiting micromachining techniques and are fixed to a common substrate 4, also of silicon. Each of the cantilever elements 3 functions as a support for a respective read/write (R/W) head 6 formed at the end of the respective cantilever element 3.

A polymer film 5, for example of polymethylmethacrylate (PMMA) and operating as a data-storage material, extends underneath the two-dimensional array 2 and has the thickness of some tens of nanometers.

Each individual R/W head 6 can be driven for reading or writing via an addressing technique similar to the one commonly used in DRAMs, hence through two multiplexers 10 and 11, which respectively select the rows and columns of the two-dimensional array 2.

The polymer film 5 is located on a mobile platform 12, which is moved in the directions x, y and z by an actuating system (not shown) comprising miniaturized windings and permanent magnets.

Each R/W head 6 acts within its own restricted data-storage area, typically of the order of 100 µm², so that, for example, in a 32×32 array, 1024 R/W heads 6 are present.

Each cantilever element 3 stores data through the respective R/W head 6, by forming, in the polymer film 5, indentations 14 (shown only schematically in FIG. 1) having a width and a space between them of some tens of nanometers.

The presence or absence of an indentation 14 encodes a datum to be stored in a binary way (for example, the presence of an indentation can represent a "1", whilst the absence of an indentation can represent a "0").

During writing, the indentations 14 are created by applying a local force on the polymer film 5 via the R/W heads 6 and, at the same time, by locally heating the polymer film 5 at high temperature (approximately 400° C.). Heating is performed by a heater element of a resistive type, here made of a silicon monocrystal with a low doping level, arranged at the R/W head 6 and the passing of an electric current. When the R/W head 6 has reached the desired temperature, it is brought into contact with the polymer film 5, which is locally softened by the heat; consequently, the R/W head 6 penetrates within the polymer film 5, generating the indentation 14.

Reading is carried out using the heater element as a temperature sensor, exploiting the variation in its resistance as a function of the temperature.

In particular, the resistance of the heater element increases with the temperature in a non-linear way starting from room temperature up to a peak value between 500° C. and 700° C. and which depends upon the concentration of dopant in the heater element.

During reading, the heater element is heated at a constant temperature of approximately 350° C., a temperature which does not cause softening of the polymer film 5 but is sufficient to create a temperature gradient with respect to the polymer film 5, as is necessary to read the data. In fact, heat is transferred between the R/W head 6 and the polymer film 5, through the air, and the heat transfer becomes more efficient when the distance between the two elements decreases, i.e., when the R/W head 6 moves inside an indentation 14. Consequently, when the R/W head 6 is in the indentation 14, the temperature of the heater element decreases, and consequently its resistance is reduced.

The variation in resistance of the heater element can thus be used for reading the stored data.

Stored data erasing can occur according to two different modes, as described hereinafter.

First, an entire data block can be erased by heating the polymer film 5 at a high temperature for a few seconds. After cooling, the surface of the polymer film 5 becomes uniform again.

Second, an individual data bit can be erased by bringing the R/W head 6 in write mode to a point adjacent to the indentation 14 to be erased. In fact, in this point, polymer molecules are concentrated on account of the previous formation of the indentation 14, which, on account of the force exerted by the R/W head 6, are now forced to redistribute uniformly, thus causing an effect of evening-out which removes the stored information.

The described device enables data-storage capacities of the order of the terabits to be obtained in an extremely small space (a few tens of square millimeters).

The use of a temperature sensor of a resistive type during reading of the stored data is, however, disadvantageous in so far as the resistance of the sensor is affected not only by the data to be read, but also by the geometrical dimensions of the sensor, according to the formula:

$$R = \rho L/A$$

where ρ is the resistivity of the sensor made of doped silicon, L is its length, and A is the surface of its cross section.

In planar silicon processes, the geometrical dimensions of the individual elements are hard to reproduce in a precise and constant way. For this reason, in a storage system of the type described previously, comprising even several thousands of read/write heads, it is reasonable to expect a certain spread in the geometrical dimensions of the various heads and hence in their resistance values.

Consequently, at worst, a difference in the value of the resistance of a R/W head 6 due to its different geometrical configuration can be erroneously associated with reading a different data bit, thus causing errors in the detection of the stored data. It must, in fact, be taken into account that the relative resistance differences ($\Delta R/R$) to be detected, that indicate the read data bits, are of the order of $10^{-4}$, and hence not much greater than the differences due to production errors.

SUMMARY

An embodiment of the present invention provides an improved read/write device of the described type, which is free from some or all of the drawbacks described in detail above.

According to an embodiment of the present invention, a read/write device for a mass storage device comprises a data storage medium storing data as local deformations, and at least one read/write element carrying a local probe facing the data-storage medium, wherein the local probe includes a bipolar junction.

BRIEF DESCRIPTION OF THE DRAWINGS

For a better understanding of the present invention, a preferred embodiment thereof is now described, purely by way of non-limiting example and with reference to the attached drawings, wherein.

DETAILED DESCRIPTION

The following discussion is presented to enable a person skilled in the art to make and use the invention. Various modifications to the embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein.

Hereinbelow, a read/write device 20 is described, belonging to a mass storage device of the above type, comprising a polymer film that can be written by making indentations, according to an embodiment of the invention.

Figure 1:
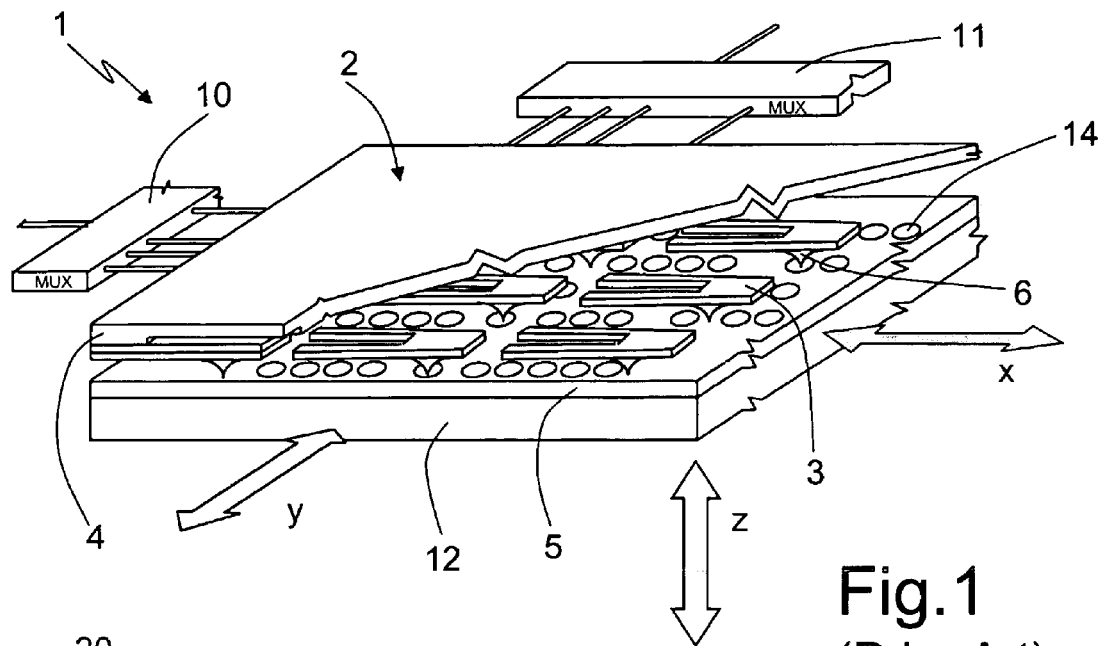
FIG. 1 is a schematic representation of a mass storage device of a known type.

In particular, in the ensuing description, the read/write device 20 is considered as belonging to a mass storage device 1 of the type described with reference to FIG. 1. Consequently, the elements that are in common with the ones of FIG. 1 are designated by the same reference numbers.

Although the description refers to the mass storage device 1, the invention is not limited to this specific application, but can advantageously be used also in other data-storage systems, provided, for example, with different supporting, moving, and/or addressing systems.

Figure 2:
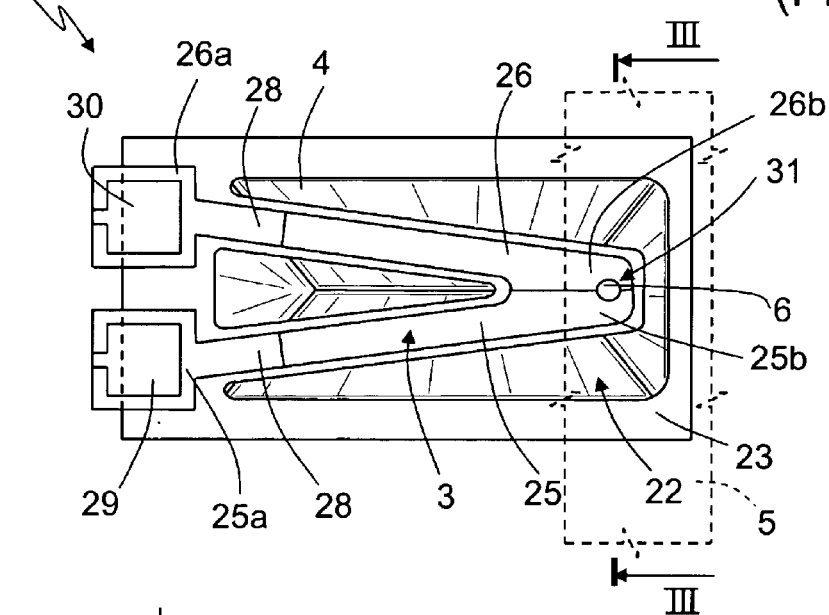
FIG. 2 is a bottom view of a read/write device for a mass storage device, according to one embodiment of the present invention.

With reference to FIG. 2, the read/write device 20 comprises a substrate 4 of semiconductor material (for example, silicon) having at least one cavity 22 and coated with an insulating layer 23, open at the cavity 22. Typically, in case of a mass storage device 1 of the type shown in FIG. 1, the substrate 4 comprises a plurality of cavities 22.

A read/write element 3 extends above each cavity 22 and is formed by a pair of arms 25 and 26, of silicon, joined together to form generally a "V". Each arm 25 and 26 has an anchorage end 25a, 26a, fixed to the substrate 4 (through the insulating layer 23), and a free end 25b, 26b, and extends in cantilever fashion for the most part of its length above the cavity 22. A tip 6, of silicon, is carried by the free ends 25b, 26b (that are connected together) and extends away from the cavity 22, i.e., towards the polymer film 5, here shown only partially with hatching.

Stress regions 28, of silicon nitride, extend above each of the arms 25 and 26, next to their anchorage ends 25a, 26a. In a per se known manner, deformation of the stress regions 28 can be controlled in order to bend the arms 25 and 26 away from the surface of the substrate 4 by a few micrometers to bring the tip 6 near to the polymer film 5.

Contact metal regions 29 and 30 extend above and are in electrical contact with the anchorage ends 25a, 26a of the arms 25, 26. Metal paths (not illustrated) extend from the contact metal regions 29 and 30 for addressing the individual pair of arms 25, 26 belonging to the read/write device 20 and the passage of an electric current I (FIG. 3) through the arms 25 and 26.

According to one embodiment of the invention, the arms 25 and 26 are doped in opposite ways; specifically, a first arm (for example, the arm 25) is doped with a high concentration of P-type dopant atoms ($P^+$ doping), and a second arm (for example the arm 26) is doped with a high concentration of N-type dopant atoms ($N^+$ doping) so as to provide a bipolar junction 31 at the contact area between the free ends 25b, 26b of the arms 25 and 26. In practice, the bipolar junction 31 and the tip 6 constitute a local probe.

Figure 4:
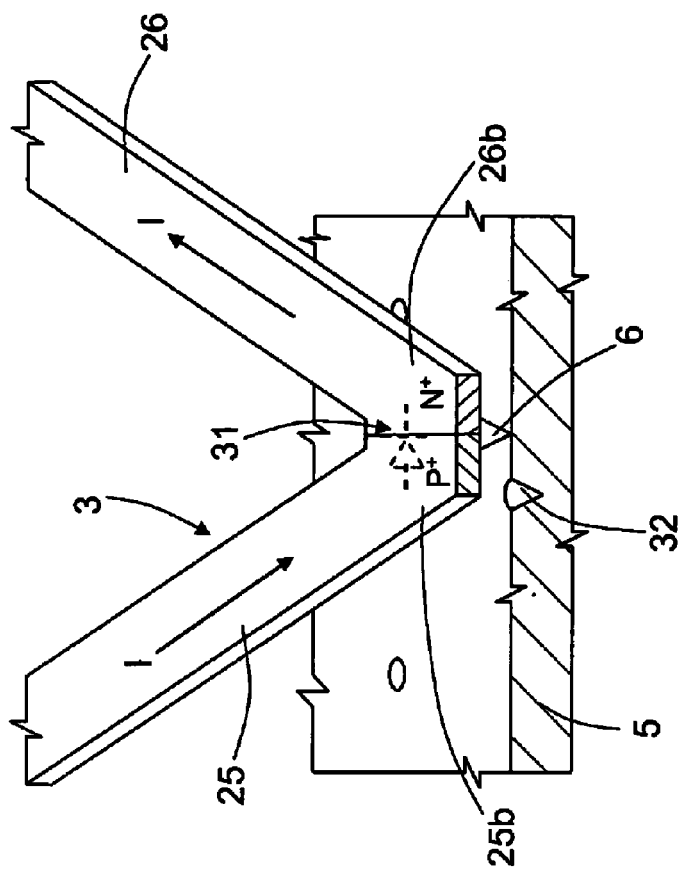
FIG. 4 shows, in a cross-section similar to that of FIG. 3, in a second operating position of the read/write device according to an embodiment of the invention.
Figure 3:
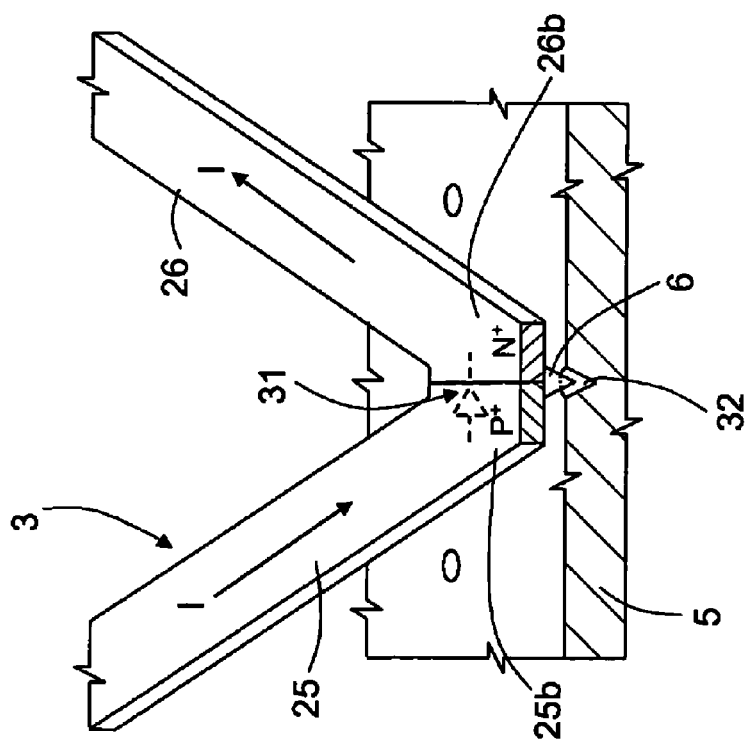
FIG. 3 shows a perspective cross-section, taken along section line III-III of FIG. 2 and with parts removed for greater clarity, of the read/write device in a first operating position according to an embodiment of the invention.

FIGS. 3 and 4 show, in particular, a perspective cross section of the read/write device 20 next to the free ends 25b, 26b, highlighting the tip 6 and a diode formed by the bipolar junction 31. FIGS. 3 and 4 further illustrate an indentation 32 formed in the polymer film 5 for storing a datum, resulting from a write operation.

The read/write device 20 can be manufactured using known micromachining techniques, for example using a CMOS-compatible process, starting from an SOI wafer, comprising a substrate (the aforementioned substrate 4), a silicon-oxide layer (insulating layer 23), and a silicon top layer, for example with the thickness of 100 μm.

The silicon top layer is etched via an appropriate photo-etching technique in order to form the arms 25 and 26. Then the arms 25 and 26 undergo N-type and P-type doping, as specified above. In particular, the dopant atoms (for example, boron atoms for P-type doping and phosphorus atoms for N-type doping) are diffused throughout the thickness of the silicon top layer that forms the arms 25 and 26.

Next, the cavity 22 is formed in the insulating layer 23 and partly in the substrate 4 underneath the arms 25 and 26, for example, via chemical or plasma etching, and a silicon-nitride layer is deposited (for example, via a chemical-vapour-deposition—CVD-technique) and defined to form the stress regions 28 at the base of the arms 25 and 26. Then, the contact metal regions 29 and 30 are formed, for instance of molybdenum.

In use, in a per se known manner, when a datum is to be written, an indentation 32 is formed on the surface of the polymer film 5 via application of heat and of a local force on the polymer film 5 through the tip 6. In particular, heating is obtained by applying a voltage of 5-6 V, which causes the passage of a relatively high electric current across the arms 25 and 26.

Reading of the datum is carried out by supplying a constant current to the bipolar junction 31 and measuring the temperature thereof.

In fact, in a way similar to known read devices, when the tip 6 is inside an indentation 32 (see FIG. 3), there is a good conduction and convection of heat between the tip 6 and the polymer film 5. Consequently, there is a high heat dissipation, and the temperature of the bipolar junction 31 decreases. Instead, when the tip 6 is outside the indentation 32 (see FIG. 4), heat is dissipated prevalently by convection, hence the heat dissipation is smaller, and the junction temperature is higher.

Figure 5:
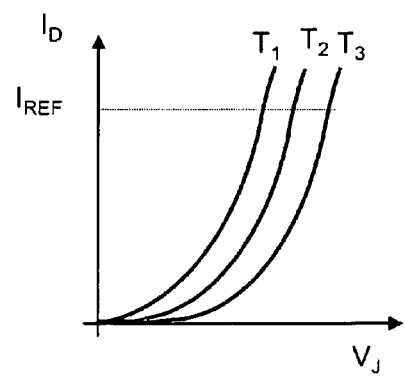
FIG. 5 is a plot of the volt-ampere characteristic of a bipolar junction as a function of temperature according to an embodiment of the invention.

In the read/write device 20, the known property of forward-biased bipolar junctions is exploited, i.e. the voltage of the junction decreases markedly as the temperature increases, typically in the proportion of approximately −2 mV/° C., as is shown in FIG. 5 and described by the following equation:

$$I_D = I_0 \left( e^{\frac{V_j}{\eta V_T}} - 1 \right)$$

where $I_D$ is the biasing current, $I_O$ is the reverse saturation current of the junction, $V_J$ is the junction voltage, T is the junction temperature, $V_T$ is the volt equivalent of temperature at 25° C., and η is a parameter that takes into account the phenomena of generation and recombination of the charge carriers within the junction.

In particular, FIG. 5 shows three curves obtained at three different junction temperatures, $T_1$, $T_2$ and $T_3$, with $T_3 < T_2 < T_1$. As can be seen, if the forward-biasing current $I_{REF}$ is kept constant, the junction voltage $V_J$ increases as the junction temperature decreases.

If the bipolar junction 31 is directly biased with a constant current $I_{REF}$ and the junction voltage $V_J$ is acquired, it is hence possible to derive the value of the bit stored.

Figure 6:
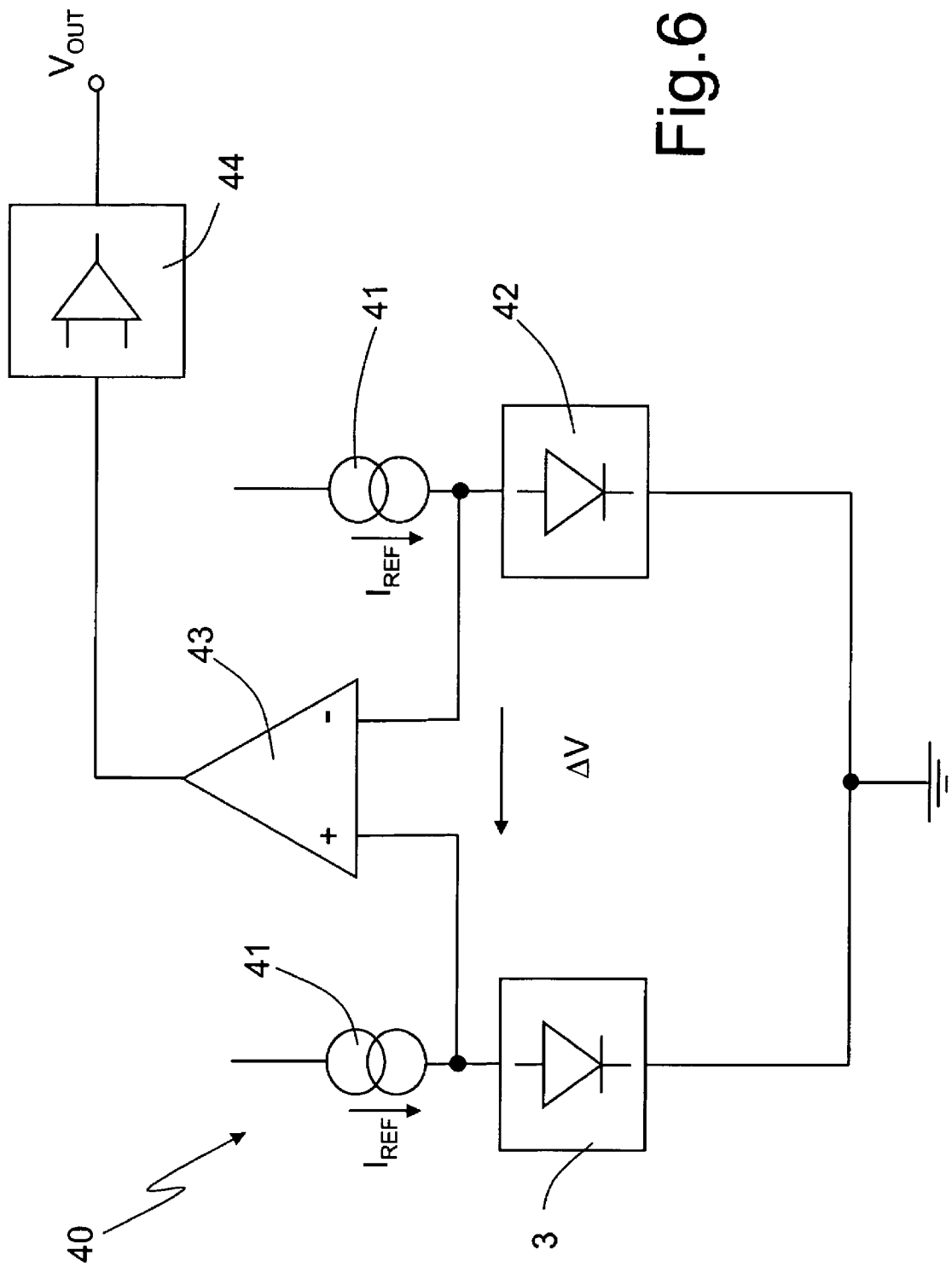
FIG. 6 is a simplified electrical circuit diagram of a data reading circuit associated with the read/write device shown in FIG. 2 according to an embodiment of the invention.

Preferably, the read/write device 20 comprises one or more dummy elements, which have the same structure as the read/write elements 3 and can be used as references during reading so as to prevent undesired changes of temperature and/or of biasing current from causing data reading errors (offset compensation). Conveniently, the dummy elements are not bent and hence do not present the stress region 28 at the base of the arms 25 and 26. The dummy elements can be used, for example, in the read circuit 40 shown in FIG. 6 and integrated in the mass storage device 1 of FIG. 1.

In detail, the read circuit 40 comprises two current sources 41, which are equal to one another, connected respectively to a read/write element 3 of the type shown in FIGS. 2-4 and to a dummy element, here designated by 42. The current sources 41 supply constant currents $I_{REF}$ and can be obtained via a single current-mirror circuit (not shown) with two outputs.

The read circuit 40 further comprises an operational amplifier 43, having a non-inverting terminal connected to the read/write element 3 and an inverting terminal connected to the dummy element 42; and a comparator stage 44, connected to the output of the operational amplifier 43 and outputting a digital voltage $V_{OUT}$ representing the read data bit. For example, suppose that the dummy element 42 has its tip 6 (not shown) outside of an indentation 32. Therefore, if the tip 6 of the element 3 is inside an indentation 32, its temperature will be substantially lower than that of the tip 6 of the element 42, and thus ΔV will be greater than a predetermined threshold to indicate a first logic value. If the tip 6 of the element 3 is outside of an indentation 32, then its temperature will be about the same as that of the tip 6 of the element 42, and thus ΔV will be less than the predetermined threshold to indicate a second logic value.

In an alternative embodiment, the concentration of the dopant atoms is regulated so as to obtain a Zener diode having a reverse breakdown voltage of approximately 3 V, and writing is carried out by reverse-biasing of the bipolar junction 31.

Thereby, a considerable decrease of the write current is obtained. In fact, given the dissipation of power P necessary for reaching the writing temperature, the current required in a reverse-biased Zener diode is:

$$I_1 = P/3 \ V$$

while the current required in a forward-biased diode with a junction voltage of 0.7 V is:

$$I_2 = P/0.7 \ V$$

hence higher by a factor of four. Thus, if a Zener diode is used, it is possible to use a simpler driving electronics and consequently achieve reduced overall dimensions and consumption levels.

The read/write device described presents the advantages outlined hereinafter.

First, the detection of temperature is directly linked to the intrinsic physical properties of semiconductors and hence is independent of external parameters, such as the geometrical dimensions of the device.

Reading of the data in the memory is thus much more reliable and in particular insensitive to any geometrical dimension spread due to the fabrication process.

Furthermore, temperature detection via a bipolar junction is affected by lower intrinsic noise as compared to temperature detection obtained via a resistance variation.

A memory device similar to the mass storage device 1 of FIG. 1 can be constructed according to one or more embodiments of the present invention, and can be incorporated into an electronic system such as a computer system.

From the foregoing it will be appreciated that, although specific embodiments of the invention have been described herein for purposes of illustration, various modifications may be made without deviating from the spirit and scope of the invention.

What is claimed is:

1. A read/write device for a data-storage system, comprising:
   a read/write element having a semiconductor junction; and
   a tip disposed across the junction and thermally coupled to the junction.

2. A read/write device for a data-storage system, comprising:
   a read/write element having a semiconductor junction; and a tip thermally coupled to the junction;
wherein the read/write element comprises a first and a second arm of semiconductor material, each arm having an anchorage end and a free end, wherein the free end of the first arm is connected to the free end of the second arm to form the semiconductor junction and each arm is differently doped.

3. The read/write device of claim 2, wherein the semiconductor junction comprises a pn junction.

4. The read/write device of claim 1, wherein the semiconductor junction forms a Zener diode.

5. The read/write device of claim 1, further comprising a reference element having a semiconductor junction.

6. A system comprising:
a deformable readable and writable media; and
a read/write device including:
a read/write element operable to read and write data having a semiconductor junction; and
a tip thermally coupled to the junction, wherein the tip is operable to form indentations in the media.

7. The system of claim 6, wherein the media is movable.

8. The system of claim 6, wherein the read/write device is operable to read the media by heating the tip and measuring a voltage of the semiconductor junction.

9. The system of claim 6, wherein the read/write device is operable to erase an indentation in the media by applying heat adjacent to the indentation.

10. The system of claim 6, wherein the semiconductor junction forms a Zener diode.

11. The system of claim 6, wherein the read/write device further comprises a reference element having a semiconductor junction.

12. A read circuit for a read/write device having a read/write element and a reference element, the read/write element and the reference element each having a semiconductor junction, the read circuit comprising:
a first current source coupled to the read/write element;
a second current source coupled to the reference element;
an amplifier having a first input coupled to the read/write element, a second input coupled to the reference element, and an output; and
a comparator stage coupled to the output of the operational amplifier for providing a voltage signal.

13. The read circuit of claim 12, wherein the currents generated by the first and second current sources are substantially equal.

14. A method for reading data from a data-storage medium, the method comprising:
conducting a current with a first semiconductor junction;
positioning a tip adjacent to a data location in the medium, the tip thermally coupled to the first semiconductor junction;
measuring a voltage across the first semiconductor junction;
determining a data value stored in the data location.

15. The method of claim 14, further comprising measuring a temperature of the first semiconductor junction.

16. A method for reading data from a data-storage medium, the method comprising:
conducting a current with a first semiconductor junction;
positioning a tip adjacent to a data location in the medium, the tip thermally coupled to the first semiconductor junction;
measuring a voltage across the first semiconductor junction;
conducting a current with a second semiconductor junction;
measuring a voltage across the second semiconductor junction; and
determining a data value stored in the data location.

17. The method of claim 16, further comprising comparing a difference between the voltages across the first and second semiconductor junctions to a predetermined threshold.

18. A method for writing data onto a data-storage medium, the method comprising;
heating a tip by conducting a current through a semiconductor junction that is thermally coupled to the tip; and
forming an indentation in the data-storage medium with the heated tip.

19. A read/write device for a data-storage system, comprising:
a read/write element having a first region and a second region wherein current is operable to flow from the first region to the second region across a junction between the first and second regions; and
a tip thermally coupled to the first and second regions at the junction.

20. A read/write device for a data-storage system, comprising:
a read/write element having a first region and a second region wherein current is operable to flow from the first region to the second region across a junction between the first and second regions; and
a tip thermally coupled to the first and second regions at the junction;
wherein the read/write element comprises a first and a second arm of semiconductor material corresponding to the first and second regions, each arm having an anchorage end and a free end, wherein the free end of the first arm is connected to the free end of the second arm to form the junction.

21. The read/write device of claim 20, wherein the first arm has a first doping type, and the second arm has a second doping type.

22. The read/write device of claim 20, wherein the junction comprises a pn junction.

23. The read/write device of claim 19, wherein the junction forms a Zener diode.

24. The read/write device of claim 19, further comprising a reference element having a semiconductor junction.

25. A method for reading data from a data-storage medium, the method comprising:
conducting a current from a first region to a second region through a semiconductor junction;
positioning a tip adjacent to a data location in the medium, the tip thermally coupled to the semiconductor junction;
measuring a voltage across the semiconductor junction;
determining a data value stored in the data location.

26. The method of claim 25, further comprising measuring a temperature of the semiconductor junction.

27. A method for reading data from a data-storage medium, the method comprising:
conducting a current from a first region to a second region through a semiconductor junction;
positioning a tip adjacent to a data location in the medium, the tip thermally coupled to the semiconductor junction;
measuring a voltage across the semiconductor junction;
conducting a current with a second semiconductor junction;
measuring a voltage across the second semiconductor junction; and
determining a data value stored in the data location.

28. The method of claim 27, further comprising comparing a difference between the voltages across the first and second semiconductor junctions to a predetermined threshold.

29. A method for writing data from a data-storage medium, the method comprising:

conducting a current from a first region to a second region through a semiconductor junction;

positioning a tip adjacent to a data location in the medium, the tip thermally coupled to the semiconductor junction;

heating the tip by conducting a current through a semiconductor junction; and forming an indentation in the data-storage medium with the heated tip.

* * * * *